Sept. 22, 1959   E. P. BOLLENBACHER ET AL   2,905,009
MECHANICAL STOP SYSTEM
Filed Aug. 15, 1955

Inventors
Earle P. Bollenbacher
William J. Pankuch
Attys

United States Patent Office 2,905,009
Patented Sept. 22, 1959

2,905,009

MECHANICAL STOP SYSTEM

Earle P. Bollenbacher, Euclid, and William J. Pankuch, Chardon, Ohio, assignors to Thompson Products, Inc., Cleveland, Ohio, a corporation of Ohio Application August 15, 1955, Serial No. 528,281

9 Claims. (Cl. 74—412)

This invention relates to a mechanical movement device, and more particularly to a mechanical stop mechanism for use in small powered mechanisms such as antenna rotators and the like, although other uses and purposes will be apparent to one skilled in the art.

Specifically, the present invention deals with a mechanism for mechanically stopping a driving gear to control the limit of rotation of a driven gear, wherein the actual turning of the driven gear feeds back the amount of turn thereof to the driving gear in a manner to cause the driving gear rotation to be blocked off. This arrangement provides excellent control of an output gear rotation of 360° more or less with positive stop limits in both directions.

Accordingly, it is an object of this invention to provide a mechanical movement device of simple construction and having a minimum of parts, wherein the mechanism is especially useful in small powered units.

Another object of this invention is to provide a mechanism for controlling the amount of rotation of a driven element by translating the movement of the driven element back to the driving element through a lever, and mechanically stopping the driving element without inducing undue strain on the component parts of the mechanism.

Still another object of this invention is to provide a mechanical stop mechanism for use in small powered units such as antenna rotators wherein a driving gear is mechanically stopped to control the limits of rotation of a driven gear.

Another feature of this invention is to provide a mechanical stop arrangement having means to stop a driving gear for controlling the limits of rotation of a driven gear, wherein the actual turning of the driven gear is translated back to the driving gear in a manner such as to cause the driving gear rotation to be blocked off.

A further feature of this invention resides in the provision of a stop mechanism having an input gear and an output gear, wherein excellent control of the output gear rotation of 360° more or less with positive stop limits in both directions are effected.

Other objects, features and advantages of the invention will be apparent from the following detailed description of the drawing, which illustrates the invention.

Figure 1:
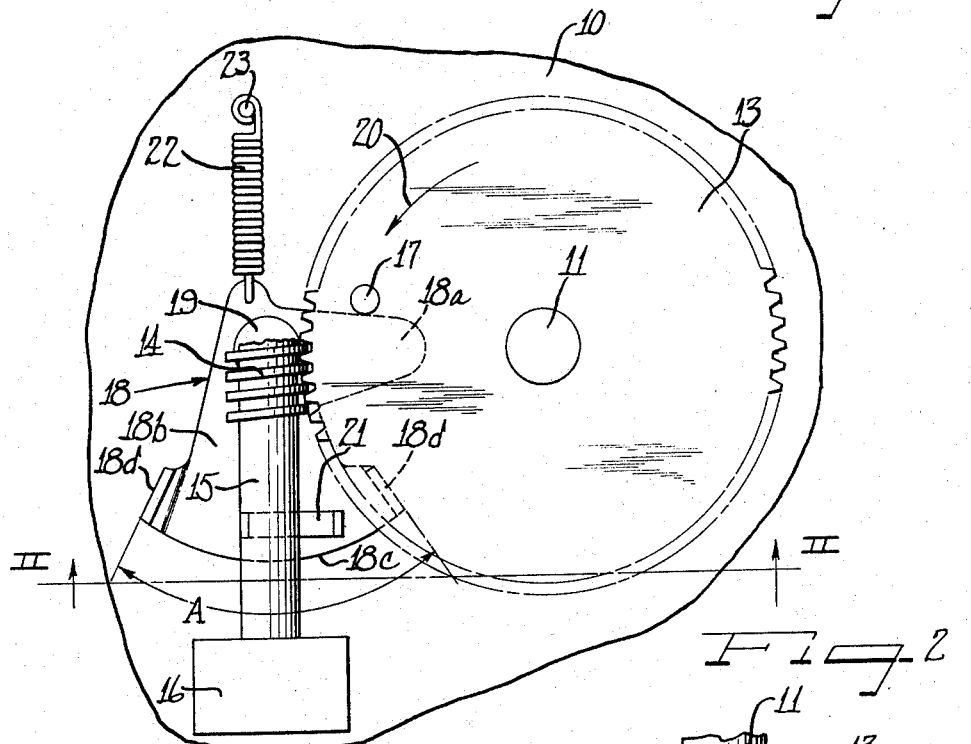
Figure 1 is a top plan view of a mechanical movement constructed in accordance with the invention, with parts broken away to show underlying parts, wherein the movement is mounted on a fragmentarily illustrated mounting base.
Figure 2:
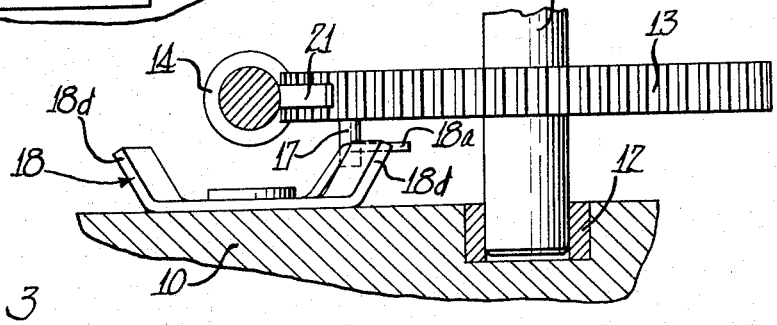
Figure 2 is a fragmentary elevational view taken substantially along line II—II of Figure 1 looking in the direction of the arrows.

The present invention will be described in the application of an antenna rotator, wherein it will be useful in providing rotation of an antenna, such as a radio, television, or radar antenna and the like, although other uses and purposes will be apparent to one skilled in the art from the following detailed description.

As seen in the drawings, the present invention may be suitably mounted on a base structure of any type, such as indicated by the numeral 10. An antenna rod or shaft 11 is bearingly supported in the base 10 as indicated at 12 for rotation therewith in an upright direction. An antenna (not shown) of any type may be mounted on the upper end of the rod 11.

A driven gear, and in this case, a worm wheel 13 is suitably secured to the antenna shaft 11. In meshing engagement with the worm wheel 13 is a driving gear or worm 14 mounted on a power input shaft 15 of a prime mover 16. The prime mover 16 is carried on the base structure 10, and may be of any suitable type, such as an electric motor.

An actuator pin 17 is carried by the worm wheel 13 near the outer periphery thereof and extends downwardly to engage an actuating arm 18a of a stop lever 18 upon a predetermined amount of rotation of the worm wheel 13. The stop lever 18 is provided with a substantially triangularly shaped body 18b pivotally mounted opposite an arcuate edge 18c by a pivot member 19 on the base structure 10. The actuating arm 18a extends upwardly and laterally from the body portion 18b of the stop lever, wherein the arm 18a projects into the circular path of the actuator pin 17.

The circular movement of the actuator pin 17 is translated to a pivotal movement of the stop lever 18 clockwise around the pivot member 19 when the worm wheel 13 is rotated in the direction of the arrow 20 or counterclockwise. The power input shaft 15 and the stop pin 21 rotate clockwise to drive the worm wheel 13 counterclockwise.

Figure 3:
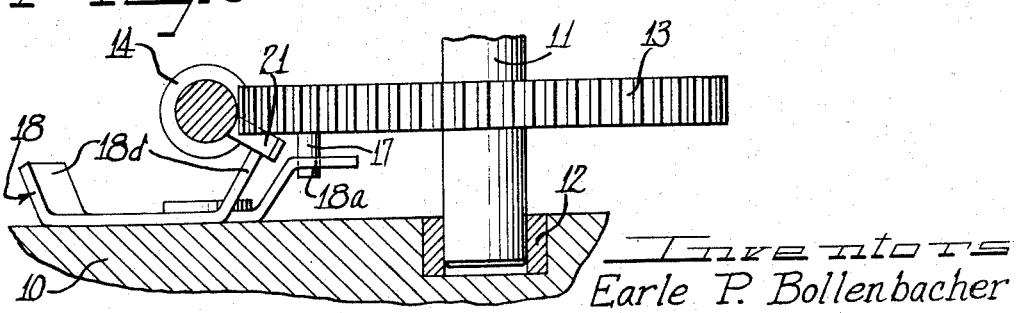
Figure 3 is a fragmentary view similar to Figure 2 but illustrating the parts in a different position, wherein the rotation of the driving gear has been stopped by displacement of the stop lever.

At each end of the arcuate edge 18c is provided an upwardly inclined member or prop arm 18d. Upon the pivotal movement of the stop lever 18, one of the prop arms 18d, and in the instant case where the pivotal movement is in a clockwise direction, the right hand prop arm 18d, shifts into the rotary path of a stop pin 21 extending laterally from the power input shaft 15. Hence, further rotation of the power input shaft 15 and worm 14 is obstructed, as seen in Figure 3. Thus, the motion of the output gear or worm wheel 13 is thereby mechanically stopped and locked without undue strain on the components.

It is seen that upon clockwise rotation of the worm wheel or output gear 13, the power input shaft 15 would be rotating counterclockwise and the actuator pin 17 would engage the opposite side of the actuating arm 18a and shift the stop lever 18 in a counterclockwise direction to move the left-hand prop arm 18d into the counterclockwise rotating path of the stop pin 21 to stop the rotation of the output gear 13.

A neutralizing spring 22 is attached at one end to the base structure 10 as indicated at 23 in Figure 1, and at the other end to the upper apex of the stop lever 18 above the pivot member 19. The neutralizing spring maintains the stop lever 18 in a vulnerable position with respect to the path of the actuator pin 17 from either rotational direction, as well as returning the stop lever to a neutral position after having been shifted by the actuator pin 17 to place the prop arms 18d out of reach of the path of the stop pin 21.

Hence, it is seen that the actual turning of the driven gear 13, a predetermined amount, translates the amount of turn back to the driving gear 14 in a manner such as to cause the driving gear rotation to be blocked off. In other words, as the worm gear 13 turns, the actuator pin 17 engages the actuating arm 18a of the stop lever 18 at a prearranged point of rotation causing the stop lever to pivot until one of its prop arms 18d interferes with the rotation of the stop pin 21 on the driving worm 14. This arrangement provides good control of the output gear rotation of 360° more or less with positive stop limits in both directions. The exact number of degrees is controlled directly by the angle between the prop arms 18d on the stop lever 18, as indicated at A.

From the foregoing, it is seen that applicants have provided a simply constructed and efficient mechanical stop system especially useful in small powered mechanisms.

It will be understood that modifications and variations may be effected without departing from the scope of the novel concepts of the present invention, but it is understood that this application is to be limited only by the scope of the appended claims.

We claim as our invention:

1. A device for use with small powered mechanisms which comprises a driving shaft, a worm on said shaft and a worm wheel being positioned to be driven by said worm, means for controlling the limits of rotation of the worm wheel including a stop pin on said driving shaft, an actuator pin on said worm wheel, and a stop lever having an arm engageable by said actuator pin and a lug for engaging said stop pin to stop the worm.

2. A mechanical stop device comprising a driving gear carried by a driving shaft, a driven gear meshing with said driving gear, a pin carried by said driven gear, stop means carried by said driving shaft, and a stop lever means actuated by said pin to engage said stop means and prevent further movement of the driving gear.

3. A mechanical stop device comprising a driving gear, a driven gear meshing with said driving gear, an intermediate independently mounted pivotal lever mounted in a plane parallel to the plane of movement of said driven gear, means located at a predetermined circumferential location on said driven gear engaging and pivoting said lever, and mechanical means on said pivotal lever for stopping said driving gear upon a predetermined rotation of said driven gear.

4. A stop device comprising a driving gear carried by a driving shaft, a driven gear meshing with said driving gear, the axes of said gears being non-intersecting, a stop means carried by said driving shaft, an actuator means carried by said driven gear, an independently pivotally mounted stop lever means engageable by said actuator means upon a predetermined rotation of said driven gear means to move from a non-interfering position to an interfering position for interfering with said stop means to stop rotation of said driving gear, and spring means biasing said stop lever means to non-interfering position.

5. A stop device for use with small powered mechanisms which comprises a mounting base, a rotatably mounted shaft on said base, a driven gear carried by said shaft, a prime mover on said base having a power shaft extending therefrom, a driving gear carried on said power shaft and in meshing engagement with said driven gear, the axes of said gears being non-intersecting, a stop means on said power shaft, an actuator means carried by said driven gear, and a stop lever means independently pivotally mounted on said base and positioned to be engaged by said actuator means and displaced to obstruct the path of the stop means thereby stopping said driving gear.

6. A stop device for use with small powered mechanisms which comprises a mounting base, a rotatably mounted shaft on said base, a driven gear carried by said shaft, a prime mover on said base having a power shaft extending therefrom, a driving gear carried on said power shaft and in meshing engagement with said driven gear, the axes of said gears being non-intersecting, a stop means laterally extending from said power shaft, an actuator means carried by said driven gear and projecting therefrom adjacent the periphery thereof, and a stop lever means mounted on said base and positioned to be engaged by said actuator pin upon a predetermined rotation of said driven gear causing displacement of the stop lever means to obstruct the path of said stop means, thereby stopping said driving gear.

7. A stop device for use with small powered mechanisms which comprises a mounting base, a rotatably mounted shaft on said base, a driven gear carried by said shaft, a prime mover on said base having a power shaft extending therefrom, a driving gear carried on said power shaft and in meshing engagement with said driven gear, the axes of said gears being non-intersecting, a stop pin laterally extending from said power shaft, an actuator pin projecting from said driven gear near the periphery thereof, and a stop lever pivotally mounted on said base, whereby a predetermined rotation of said driven gear causes the actuator pin to displace the stop lever and obstruct the path of said stop pin to stop the driving gear.

8. A stop device for use with small powered mechanisms which comprises a mounting base, a rotatably mounted shaft on said base, a driven gear carried by said shaft, a prime mover on said base having a power shaft extending therefrom, a driving gear carried on said power shaft and in meshing engagement with said driven gear, the axes of said gears being non-intersecting, a stop pin laterally extending from said power shaft, an actuator pin projecting from said driven gear near the periphery thereof, and a stop lever pivotally mounted on said base, said feedback lever being normally biased to a neutral position, whereby a predetermined rotation of said driven gear causes the actuator pin to displace the stop lever and obstruct the path of said stop pin to stop the driving gear.

9. A stop device for use with small powered mechanisms which comprises a mounting base, a rotatably mounted shaft on said base, a driven gear carried by said shaft, a prime mover on said base having a power shaft extending therefrom, a driving gear carried on said power shaft and in meshing engagement with said driven gear, the axes of said gears being non-intersecting, a stop pin laterally extending from said power shaft, an actuator pin projecting from said driven gear near the periphery thereof, and a stop lever pivotally mounted on said base, said stop lever being resiliently biased to a neutral position and carrying an actuating arm in the line of path of said actuator pin and a prop arm spaced from said actuating arm and adapted to be in the path of movement of said stop pin upon pivotal displacement of said stop lever caused by a predetermined rotation of said driven gear wherein the actuator pin strikes the actuating arm.

References Cited in the file of this patent

UNITED STATES PATENTS

| 758,514 | Great Britain | Oct. 3, 1956 |
| 2,477,670 | Toth et al. | Aug. 2, 1949 |
| 2,479,555 | Burbage | Aug. 23, 1949 |
| 2,727,613 | Radkowski | Dec. 20, 1955 |

FOREIGN PATENTS

| 758,514 | Great Britain | Oct. 3, 1956 |